United States Patent
Lee et al.

(10) Patent No.: US 9,319,826 B2
(45) Date of Patent: *Apr. 19, 2016

(54) METHOD FOR PROVIDING AN M2M SERVICE, AND METHOD AND APPARATUS FOR M2M COMMUNICATION

(75) Inventors: Eun Jong Lee, Anyang-si (KR); Young Soo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 14/343,035

(22) PCT Filed: Sep. 7, 2012

(86) PCT No.: PCT/KR2012/007220
§ 371 (c)(1),
(2), (4) Date: Mar. 5, 2014

(87) PCT Pub. No.: WO2013/036068
PCT Pub. Date: Mar. 14, 2013

(65) Prior Publication Data
US 2014/0233514 A1    Aug. 21, 2014

Related U.S. Application Data

(60) Provisional application No. 61/532,572, filed on Sep. 9, 2011.

(51) Int. Cl.
*H04W 80/04* (2009.01)
*H04W 84/12* (2009.01)
(Continued)

(52) U.S. Cl.
CPC .............. *H04W 4/005* (2013.01); *H04W 8/186* (2013.01); *H04W 8/26* (2013.01); *H04W 92/18* (2013.01)

(58) Field of Classification Search
CPC ..... H04W 84/12; H04W 80/04; H04W 72/04; H04W 88/08
See application file for complete search history.

(56) References Cited

U.S. PATENT DOCUMENTS

2011/0085475 A1*  4/2011  Sinivaara et al. ............. 370/277
2011/0314056 A1* 12/2011  Moore .......................... 707/769
(Continued)

FOREIGN PATENT DOCUMENTS

KR   10-2011-0023726      3/2011
WO     2011/0087826 A1   12/2010
WO     2011/101032       8/2011

OTHER PUBLICATIONS

Huang, et al., "M2M Group ID Assignment Scheme in IEEE802.16m System," IEEE 802.16 Broadband Wireless Access Working Group, IEEE C802.16p-0154r1, Jul. 2011, 7 pages.

(Continued)

*Primary Examiner* — Andrew Lee
(74) *Attorney, Agent, or Firm* — Lee, Hong, Degerman, Kang & Waimey

(57) ABSTRACT

Provided is a method for machine to machine (M2M) communication. An M2M device acquires an M2M group identification (MGID) and an M2M zone identification. The M2M device checks whether or not the M2M device has escaped from the M2M group zone. If the M2M device has escaped from the M2M group zone, the M2M device transmits, to a base station, an update request message which requests that the M2M group identifier be updated. The M2M device receives, from the base station, a response message as a response to the update request message.

17 Claims, 13 Drawing Sheets

(51) Int. Cl.
*H04W 4/00* (2009.01)
*H04W 8/18* (2009.01)
*H04W 8/26* (2009.01)
*H04W 92/18* (2009.01)

(56) References Cited

U.S. PATENT DOCUMENTS

| | | | |
|---|---|---|---|
| 2012/0190397 A1* | 7/2012 | Jung et al. | 455/519 |
| 2012/0257556 A1* | 10/2012 | Jung et al. | 370/311 |
| 2012/0281649 A1* | 11/2012 | Zhou et al. | 370/329 |
| 2013/0003972 A1* | 1/2013 | Kang et al. | 380/270 |
| 2013/0258953 A1* | 10/2013 | Huang et al. | 370/329 |
| 2014/0010187 A1* | 1/2014 | Huang et al. | 370/329 |
| 2014/0221036 A1* | 8/2014 | Lee et al. | 455/518 |
| 2014/0256324 A1* | 9/2014 | Mohanty et al. | 455/436 |
| 2014/0269518 A1* | 9/2014 | Nigam et al. | 370/328 |
| 2015/0124681 A1* | 5/2015 | Zhou et al. | 370/312 |
| 2015/0189458 A1* | 7/2015 | Li et al. | 370/328 |

OTHER PUBLICATIONS

Park, et al., "Reply contribution on C80216p-1110002 (Location update)," IEEE 802.16 Broadband Wireless Access Working Group, IEEE C802.16p-11/0036, Mar. 2011, 4 pages.

Cha, et al., "Device ID and Group ID for M2M Devices," IEEE 802.16 Broadband Wireless Access Working Group, IEEE 802.16p-11/0019, Mar. 2011, 20 pages (relevant pages: pp. 6-7).

State Intellectual Property Office of the People's Republic of China Application Serial No. 2012800523709, Office Action dated Feb. 14, 2016, 5 pages.

* cited by examiner

METHOD FOR PROVIDING AN M2M SERVICE, AND METHOD AND APPARATUS FOR M2M COMMUNICATION

CROSS-REFERENCE TO RELATED APPLICATIONS

This application is the National Stage filing under 35 U.S.C. 371 of International Application No. PCT/KR2012/007220, filed on Sep. 7, 2012, which claims the benefit of U.S. Provisional Application Ser. No. 61/532,572, filed on Sep. 9, 2011, the contents of which are all hereby incorporated by reference herein in their entirety.

BACKGROUND OF THE INVENTION

1. Field of the Invention

The present invention relates to wireless communication, and more particularly, to a method for resuming a machine to machine (M2M) service in a wireless communication system and an M2M device that operates according to the method.

2. Related Art

With the development of wireless communication technology, not communications between a general user and a base station, but various types of wireless communication systems appear.

Machine to machine (M2M) communication is also referred to as machine type communication (MTC) and is one type of data communication including one or more entities that dos not require human interaction. That is, the M2M communication is called a concept that not a terminal used by human but a machine device performs communication by using the existing wireless communication network. The machine device used in the M2M communication is referred to as an M2M device. The M2M device includes various devices including a vending machine, an electricity meter, a machine for measuring a water level of a dam, and the like.

Since a characteristic of the M2M device is different from that of a general terminal, a service optimized for the M2M communication may be different from a service optimized for human to human communication. The M2M communication may be characterized by different market scenarios, data communication, low cost and small efforts, potentially a lot of M2M device, a wide service zone, and low traffic per M2M device as compared with a current mobile network communication service.

Meanwhile, the M2M device may have much lower or higher mobility than the terminal. When the M2M device escapes from a service zone, a method for efficiently resuming the service is required.

SUMMARY OF THE INVENTION

An object of the present invention is to provide a method for resuming a machine to machine (M2M) service based on a service unavailability/resuming indication message and an M2M device that operates according to the method.

In accordance with an aspect of the present invention, there is provided a method for providing, a base station, a machine to machine (M2M) service in M2M communication. The method may include: Receiving an update request message of requesting updating an M2M group identifier (MGID) from an M2M device, wherein the update request message includes an M2M group identifier and an M2M zone identifier, the M2M group identifier identifies a service flow shared by a group of M2M devices in an M2M group zone, and the M2M zone identifier identifies the M2M group zone; and transmitting a response message to the update request message to the M2M device, wherein the response message includes a service unavailability indicator that indicates whether the service flow identified by the M2M group identifier is provided in a zone indicated by the M2M zone identifier.

In accordance with another aspect of the present invention, there is provided a method for machine to machine (M2M) communication by an M2M device. The method may include: acquiring an M2M group identifier (MGID) and an M2M zone identifier, wherein the M2M group identifier identifies a service flow shared by a group of M2M devices in an M2M group zone and the M2M zone identifier identifies the M2M group zone; verifying whether the M2M device escapes from the M2M group zone; transmitting an update request message of requesting updating the M2M group identifier when the M2M device escapes from the M2M group zone; and receiving a response message as a response to the update request message from the base station, wherein the response message includes a service unavailability indicator that indicates whether the service flow identified by the M2M group identifier is provided in a zone indicated by the M2M zone identifier.

In accordance with yet another aspect of the present invention, there is provided a machine to machine (M2M) device in an M2M communication system. The M2M device includes a radio frequency (RF) unit transmitting or receiving a radio signal; and a processor connected to the RF unit. The processor may acquires an M2M group identifier (MGID) and an M2M zone identifier, wherein the M2M group identifier identifies a service flow shared by a group of M2M devices in an M2M group zone and the M2M zone identifier identifies the M2M group zone; verifies whether the M2M device escapes from the M2M group zone; transmits an update request message of requesting updating the M2M group identifier when the M2M device escapes from the M2M group zone; and receives a response message as a response to the update request message from the base station, wherein the response message includes a service unavailability indicator that indicates whether the service flow identified by the M2M group identifier is provided in a zone indicated by the M2M zone identifier.

When a machine to machine (M2M) device escapes from a service zone, a service can be efficiently resumed.

DESCRIPTION OF EXEMPLARY EMBODIMENTS

Figure 1:
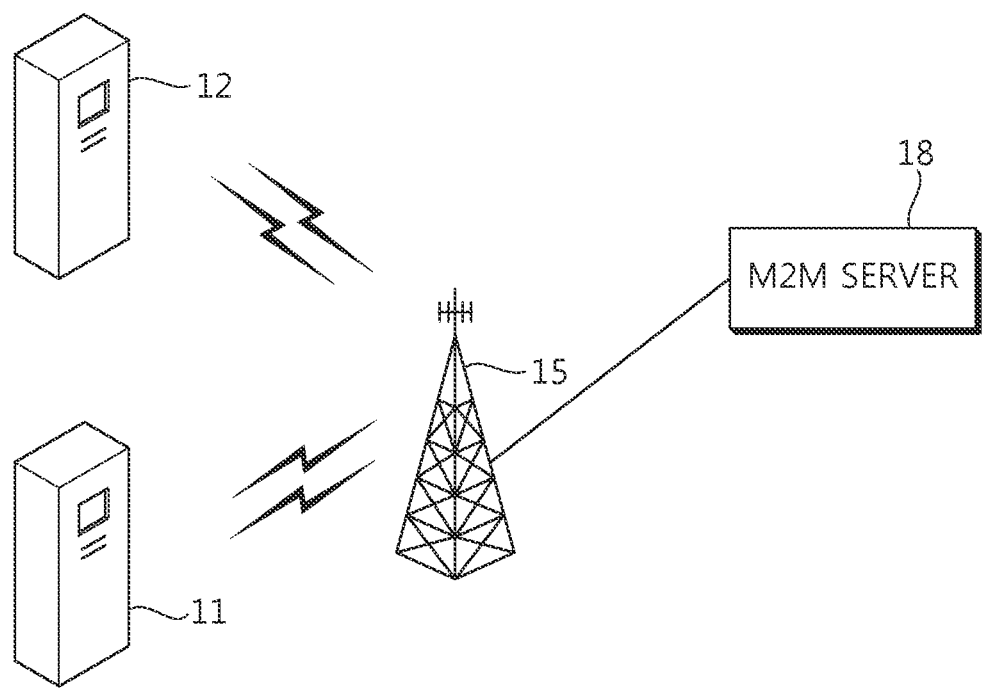
FIG. 1 illustrates one example of machine to machine (M2M) communication.

FIG. 1 illustrates one example of machine to machine (M2M) communication.

The M2M communication is also referred to as machine type communication (MTC), and represents information exchange between M2M devices 11 and 12 through a base station 15 which accompanies human interaction or information exchange between the M2M device 11 and an M2M server 18 through the base station.

The M2M server 18 is an entity that communicates with the M2M device 11. The M2M server executes an M2M application and provides an M2M specific service to the M2M device 11.

The M2M device 11 as a wireless device that provides the M2M communication may be fixed or movable. The M2M device is also referred to as an MTC device.

The service provided through the M2M communication has a differentiation from a service in communication interfered by human in the related and includes various categories of services including tracking, metering, payment, a medical field service, remote control, and the like.

Representative examples of individual service requirements of M2M features will be described below.

1) Time controlled feature: represents that the M2M device transmits or devices data in only a predetermined specific section. Accordingly, it is possible to prevent unnecessary signaling outside the predetermined specific section.

2) Time tolerant feature: represents that the M2M device may delay transferring data. A network operator may restrict the access of the M2M device to a network or transmission of data to another MTC device and dynamically restrict the amount of data which the MTC device may transfer in a specific zone.

3) Offline indication feature: represents that notification is requested to the M2M device an appropriate time when signaling is not enabled between the M2M device and the network.

4) Priority alarm message (PAM) feature: represents that when an emergency situation in which the M2M device requests burglary, vandalism, or immediate caution occurs, the M2M device preferentially warns the network about the emergency situation.

Layout of hundreds to thousands of M2M devices in one cell (or base station) is considered. Accordingly, since it is difficult to identify the M2M device by only existing terminal identifiers, identifiers described below are considered.

Station identifier (STID): represents an identifier that identifies the M2M device in a domain of the base station. The base station may allocate the same STID to a plurality of M2M devices.

M2M group identifier (MGID): The MGID is a 12-bit identifier used to uniquely identify a multicast service flow shared by a group of the M2M devices in the M2M group zone. The M2M group zone is a logical zone including one or more base stations. The M2M group zone is identified by an M2M group zone index. The MGID is assigned during a dynamic service addition (DSA) process. If the M2M device escapes from the network or the service flow is not deleted, the M2M device retains the MGID in an idle mode.

Fixed M2M deregistration identifier (FMDID): represents a 16-bit identifier used to uniquely identify the M2M device in a zone of the base station. The FMDID is assigned to the M2M device during idle mode entry and released while the M2M device reenters the network.

Hereinafter, an idled mode operation in an IEEE 802.16m based system will be described with reference to Clause 16.2.18 of IEEE (Institute of Electrical and Electronics Engineers) P802.16m/D10 "Part 16: Air Interface for Broadband Wireless Access Systems Advanced Air Interface" disclosed on Feb. 17, 2011. However, the wireless communication system according to the present invention is not limited to the IEEE 802.16m based system and may be applied to various wireless communication systems including 3GPP (3rd Generation Partnership Project) LTE (long term evolution), and the like.

Figure 2:
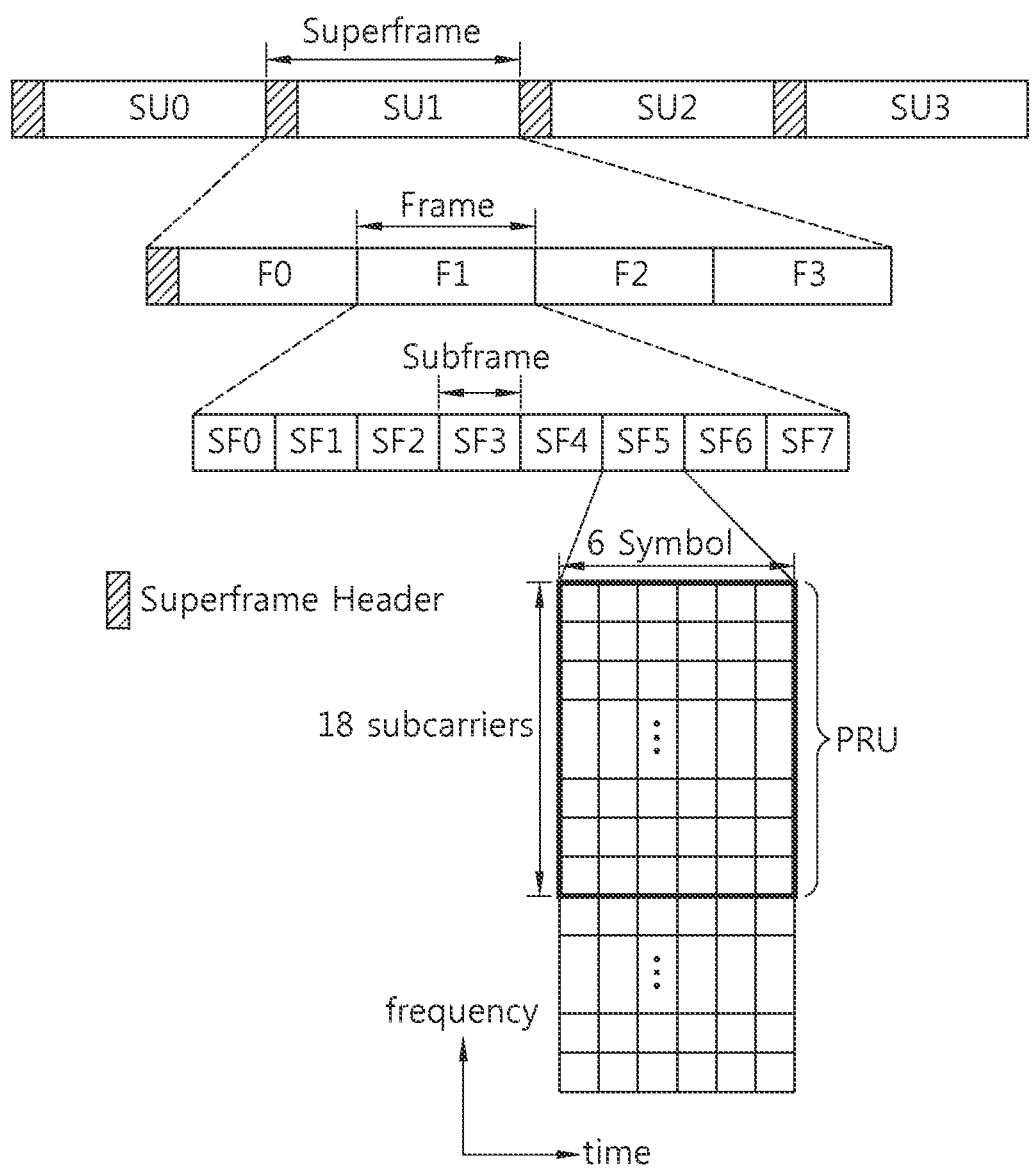
FIG. 2 illustrates one example of a frame structure of an IEEE 820.16m.

FIG. 2 illustrates one example of a frame structure of an IEEE 820.16m.

A superframe (SF) includes a superframe header (SFH) and four frames (including F0, F1, F2, and F4). All of the lengths of the respective frames in the superframe may be the same as each other. The size of the superframe is 20 ms and the size of each frame is 5 ms.

The frame includes a plurality of subframes SF0, SF1, SF2, SF3, SF4, SF5, SF6, and SF7. The subframe may be used for uplink transmission or downlink transmission. The subframe includes a plurality of orthogonal frequency division multiplexing (OFDM) symbols in a time domain. The OFDM symbol is used to express one symbol period and multiple access methods are not limited in terms of a name thereof.

The subframe includes 6 OFDM symbols. This is just exemplary and the subframe may include 5, 7, or 9 OFDM symbols and the present invention is not limited thereto.

A type of the subframe may be defined according to the number of the OFDM symbols included in the subframe. For example, it may be defined that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A time division duplex (TDD) method or a frequency division duplex (FDD) method may be applied to the frame. Subframes in the TDD frame may be divided into uplink subframes and downlink subframes.

The size of the superframe, the number of the frames included in the superframe, the number of the subframes included in the frame, and the number of the OFDM symbols in the subframe may be changed and the present invention is not limited thereto.

The SFH may transport essential system parameter and system configuration information. The SFH may be transmitted in five last OFDM symbols of a first subframe in the superframe.

A physical resource unit (PRU) as a basic resource assignment unit includes 18 subcarriers in consecutive OFDM symbols of the same subframe.

In an IEEE 802.16 system, an advanced-MAP (A-MAP) transports service control information. A non-user specific A-MAP transports information which is not limited to a specific user or a specific user group. A hybrid automatic repeat request (HARQ) feedback A-MAP transports HARQ ACK/NACK information regarding uplink data transmission. A power control A-MAP transports a power control command to a mobile station (MS).

An assignment A-MAP transports resource assignment information. The assignment A-MAP includes several types including a downlink (DL) basic assignment A-MAP, an uplink (UL) basic assignment A-MAP, a code division multiple access (CDMA) assignment A-MAP, and the like.

The CDMA assignment A-MAP includes UL resource assignment depending on a bandwidth request or UL resource assignment depending on a ranging request.

All of the A-MAPs share a physical resource region called an A-MAP region. The A-MAP region is present for each downlink subframe.

Figure 3:
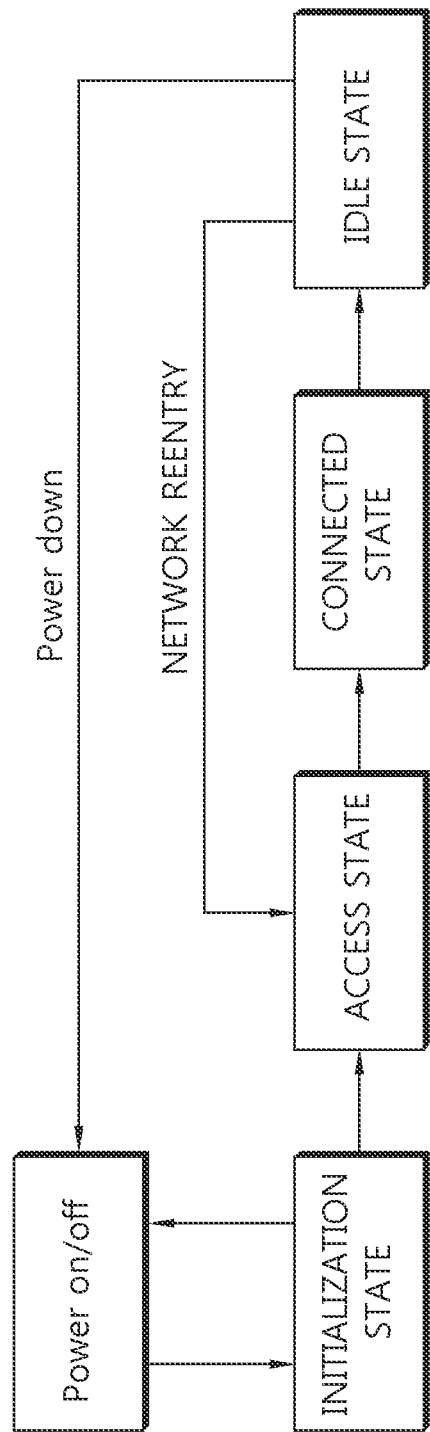
FIG. 3 illustrates an operation transition diagram in the IEEE 802.16m.

FIG. 3 illustrates an operation transition diagram in the IEEE 802.16m.

In an initialization state, the mobile station (MS) performs cell selection by receiving synchronization and system configurations.

In an access state, the mobile station performs the network entry. The network entry is a procedure including ranging with the base station, basic capability negotiation, and authentication.

In a connected state, the mobile station operates in one of a sleep mode, an active mode, and a scanning mode. During the connected state, the mobile station retains a connection established during the access state. The mobile station in the active mode may continuously transmit or receive scheduled data. In the sleep mode, a radio frame is divided into a sleep window and a listening window. The mobile station in the sleep mode may receive data from the base station during the listening window. The mobile station in the scanning mode performs measurement indicated by the base station.

In the idle state, the mobile station operates in the idle mode. In the idle mode, a paging available interval and a paging unavailable interval are provided. The base station does not transmit predetermined downlink traffic such as a paging message in the paging unavailable interval.

Figure 4:
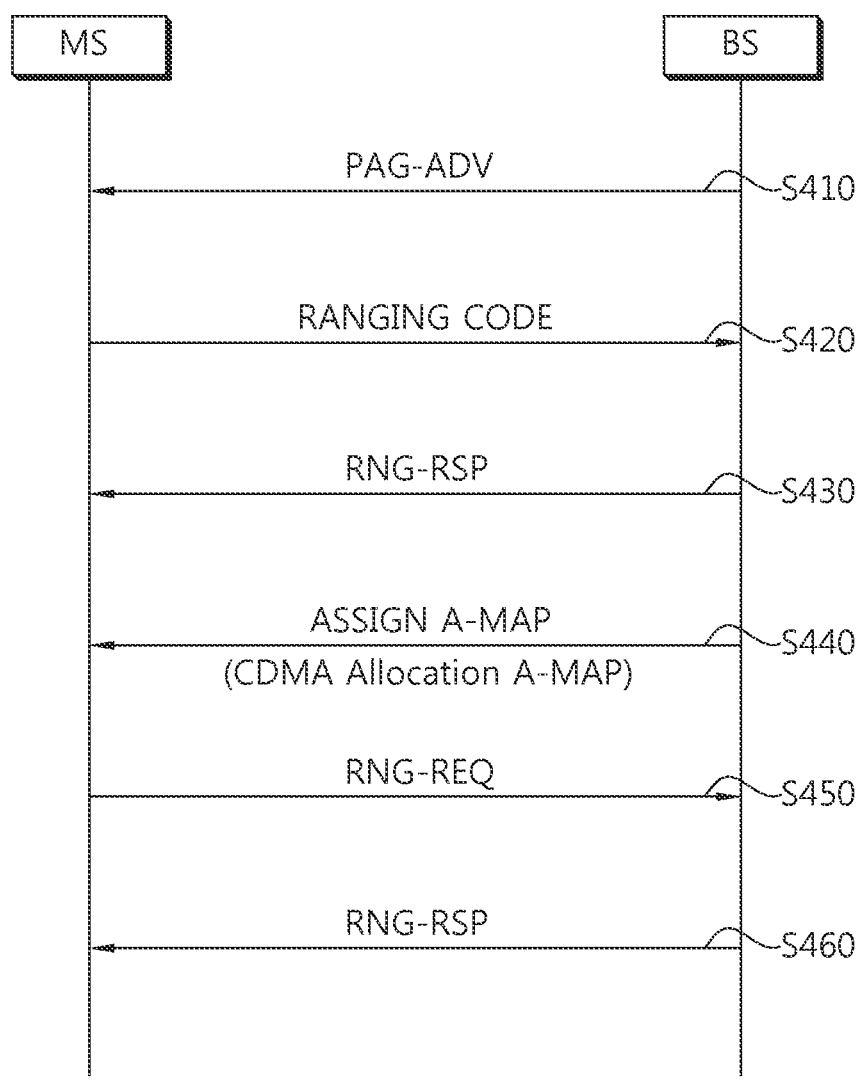
FIG. 4 is a flowchart illustrating an operation in an idle mode in the IEEE 802.16m.

FIG. 4 is a flowchart illustrating an operation in an idle mode in the IEEE 802.16m.

In step S410, the mobile station in the idle mode monitors receiving the paging message during the paging available interval to receive a paging advertisement (PAG-ADV) message. The paging message is a notification message that indicates whether downlink traffic pended to a specific mobile station is present.

The base station may indicate each mobile station to perform ranging for network reentry or location update through the PAG-ADV message.

In step S420, when the PAG-ADV message requests the network reentry, the mobile station ends the idle mode and transmits a ranging code to the base station.

In step S430, the mobile station receives, from the base station, a ranging-response (RNG-RSP) message as a response to the ranging code. The RNG-RSP message includes a status code. The status code indicates one of 'continue', 'success', and 'abort'.

When receiving the RNG-RSP message in which the status code is 'continue', the mobile station transmits the ranging code again.

When the status code indicates 'success', the mobile station receives the assignment A-MAP. The assignment A-MAP includes the CDMA assignment A-MAP.

In step S450, the mobile station transmits a ranging-request (RNG-REQ) message to the base station by using UL resource assignment indicated by the CDMA assignment A-MAP.

In step S460, the mobile station receives the RNG-RSP message as a response to the RNG-REQ message.

Meanwhile, as described above, the M2M group identifier (MGID) is a 12-bit identifier used to uniquely identify the M2M group in the domain of the network entity.

The MGID may be assigned to during dynamic service addition after initial network entry, and the M2M device may retain the MGID assigned during the connected/idle mode. For example, the MGID may be assigned through mapping between the flow and the MGID in a connection addition step.

The MGID may be released when entering an explicit network exit or deregistration with context retention (DCR) mode. Further, the MGID may be deleted by a dynamic service deletion (DSD) procedure. For example, when the flow is deleted, the MGID may be released.

Meanwhile is updated based on the mode of the M2M device.

For example, when the M2M device is in the connected mode, the MGID of the M2M device may be updated by the dynamic service change (DSC) procedure or updated/added through an RNG-RSP message in a handover (HQ). The RNG-RSP represents a ranging response.

For example, when the mobile station is in the idle mode, the MGID of the M2M device may be updated through the location update or network reentry. When MGIDs of all M2M devices in the group are intended to be changed, the MGID of the M2M device may be updated by group location update through the paging message. When time base update is performed, the MGID of the M2M device may be updated through the RNG-RSP message.

Figure 5:
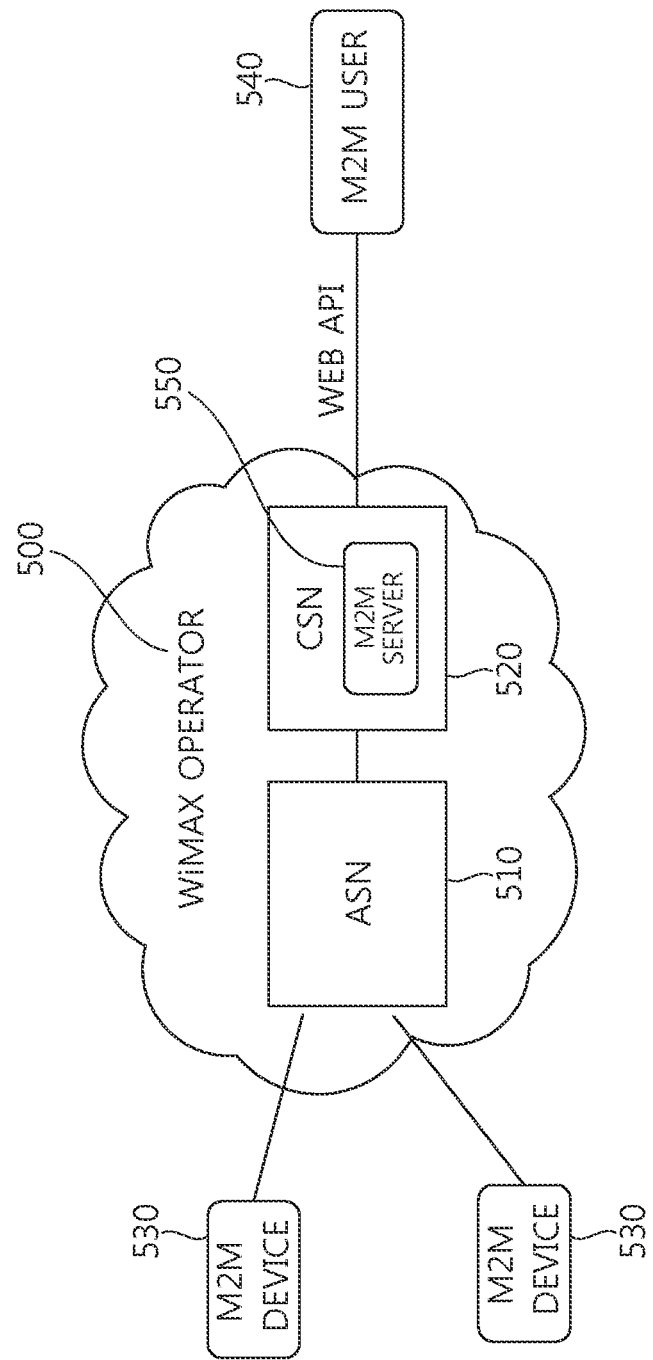
FIG. 5 and FIG. 6 illustrate scenarios based on a position of an M2M server defined by a WiMAX forum.
Figure 6:
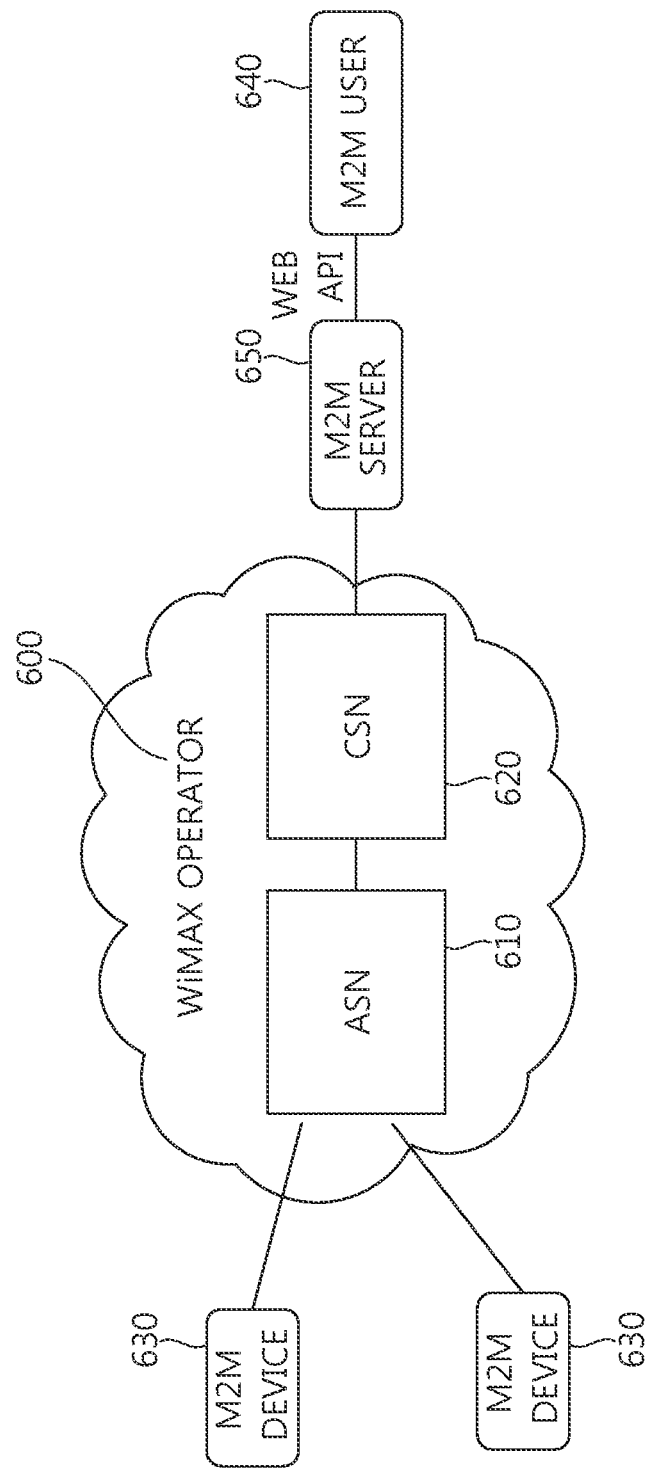

Meanwhile, a WiMAX forum defines two different scenarios based on the position of the M2M server. FIGS. 5 and 6 illustrate two scenarios. According to the scenarios defined by the WiMAX forum, WiMAX operators 500 and 600 include access service networks (ASN) 510 and 610 and connectivity service networks (CSN) 520 and 620, as illustrated in FIGS. 5 and 6. The ASN includes the base station and an access service network gateway (ASN GW). The base station provides application services such as the Internet, an application service such as VoIP, and a wireless access with the CSNs 520 and 620. The ASN GW controls the base station and takes charge of connection with the CSNs 520 and 620. The CSNs 520 and 620 provide a home agent function and authentication and charging functions of a mobile IP.

M2M users 540 and 640 may communicate with the M2M servers 550 and 560 through an web application programming interface (API). The web API is an opened API that allows a programmatic function to be easily used outside by providing an API through a web to develop a related service.

FIG. 5 illustrates a case in which the M2M server 550 is present in the CSN 520. FIG. 6 illustrates a case in which the M2M server 650 is present outside the CSN 620. In an example of FIG. 5, the M2M server 550 is operated by the WiMAX operator 500, but in an example of FIG. 6, the M2M server 650 is not operated by the WiMAX operator 600.

According to the related art, the M2M group ID, that is, the MGID is assigned by the M2M network entity, but the M2M network entity is not defined in detail. When an M2M subscriber (alternatively, user) provides the M2M service to only an M2M device positioned in a specific region, a specific M2M server may be connected to only a specific ASN.

Figure 7:
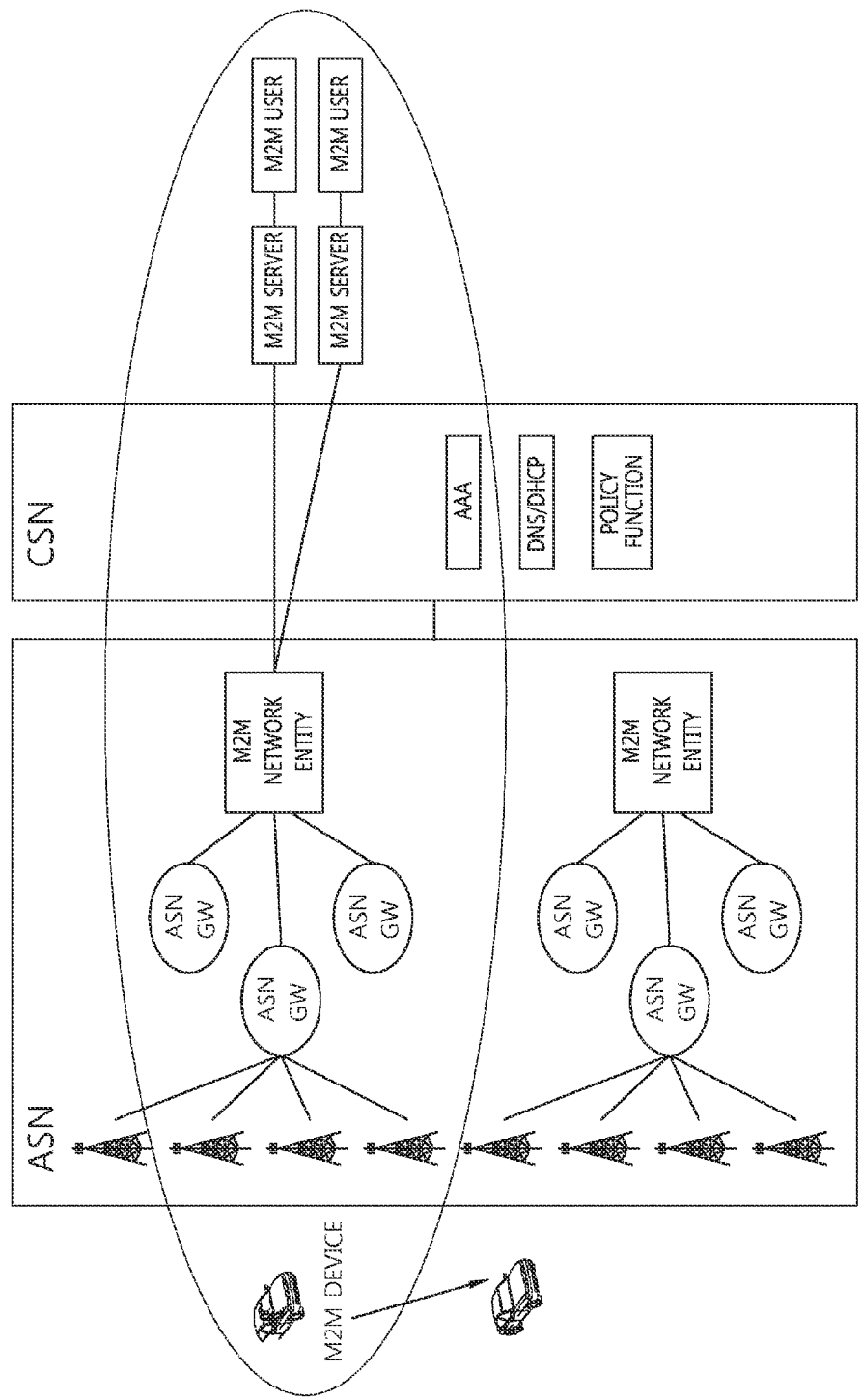
FIG. 7 illustrates a case in which an M2M device escapes from an M2M service zone.

Meanwhile, FIG. 7 illustrates a case in which the M2M device escapes from the M2M service zone.

According to the related art, in the case in which the M2M device escapes from the M2M service zone, for example, in the case in which the M2M device escapes from a domain of the network entity assigned with the MGID, when the escape is not recognized, a problem that data regarding a wrong M2M service flow is received occurs.

Moreover, when the M2M device escapes from a current region where the MGID is available and thereafter, moves to a region where the corresponding service is not provided, it needs to be considered that the MGID needs to be released.

Accordingly, the present invention provides a method for resuming an M2M service based on a service unavailability/resuming indication message and an M2M device that operates according to the method.

Hereinafter, it is assumed that the M2M device knows a domain of a network entity assigned with its current MGID, that is, a domain where the current MGID is available.

For example, when the M2M device is allocated with the MGID, the M2M device receives even an ID of an network entity that assigns the MGID. That is, the base station notifies to the M2M device the ID of the network entity to which the base station belongs to allow the M2M device to recognize that the M2M device escapes from the domain of the network entity.

As another example, the M2M device receives an even M2M zone identifier when being assigned with the MGID. Herein, the M2M zone identifier is used to identify the M2M zone and may mean the M2M group zone index. That is, the base station notifies to the M2M device the M2M zone identifier to allow the M2M device to recognize that the M2M device escapes from the domain of the network entity.

The M2M device may recognize all of the IDs (M2M zone identifiers) of the network entities regardless of the mode status, that is, regardless of the connected mode or the idle mode.

Figure 8:
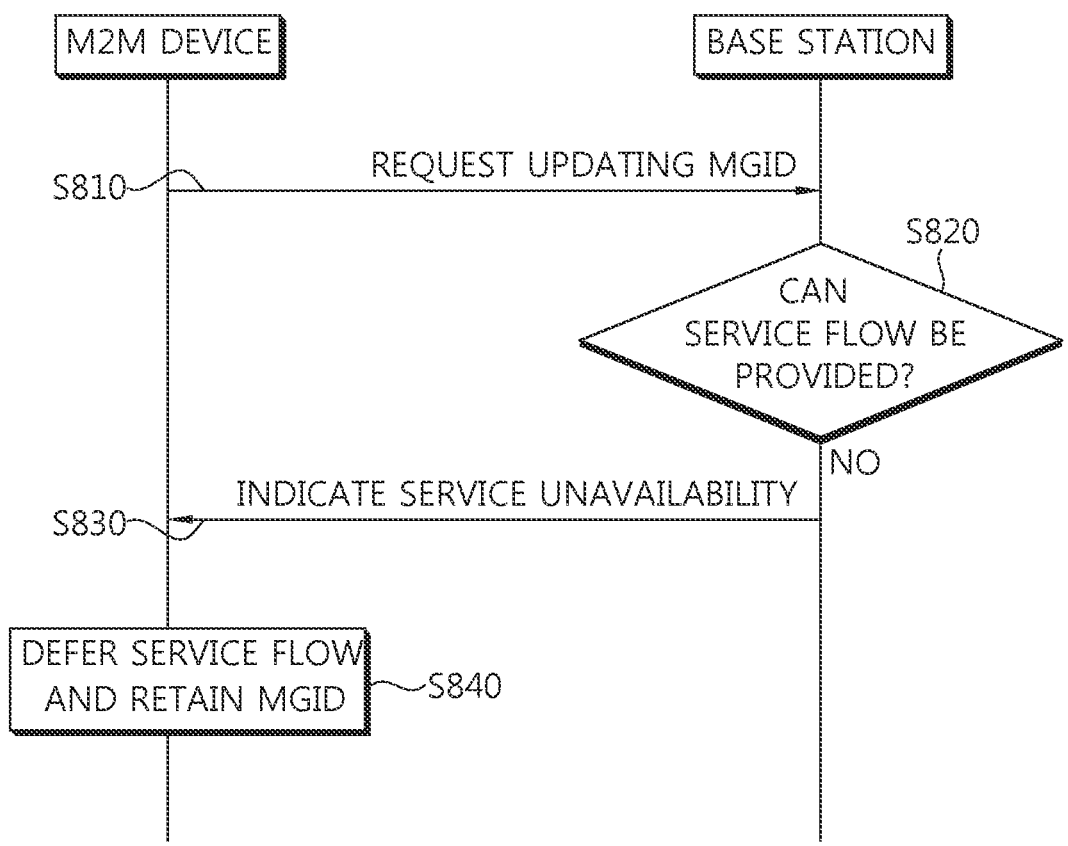
FIG. 8 illustrates a flowchart for resuming an M2M service when an M2M device escapes from an M2M group zone according to an embodiment of the present invention.

FIG. 8 is a flowchart illustrating a method for resuming an M2M service when an M2M device escapes from an M2M group zone.

In the case in which the M2M device escapes from the domain where the current MGID is available, that is, the M2M device recognizes that the M2M device escapes from the M2M group zone, the M2M device may request the base station to update the MGID (S810).

When the base station is requested to update the MGID from the M2M device, the base station judges whether the service flow used by the corresponding M2M device may be provided within current coverage (S820).

If the service flow used by the M2M device may not be provided within the current coverage, the base station transmits a service unavailability indication message to the M2M device (S830).

The M2M device in the connected mode may receive the service unavailability indication through a DSC message.

The M2M device in the idle mode may receive the service unavailability indication in the MGID update procedure. For example, while the MGID is updated in the location update or network reentry procedure, the M2M device may receive the service unavailability indication. For example, when the M2M device requests updating the MGID through the RNG-REQ message, the M2M device may receive the service unavailability indication through the response to message, that is, the RNG-RSP message is used.

The M2M device that receives the service unavailability indication recognizes that the corresponding service is unavailable in a current zone and defers the corresponding service flow (S840). In this case, the existing MGID of the M2M device is not released but retained.

Figure 9:
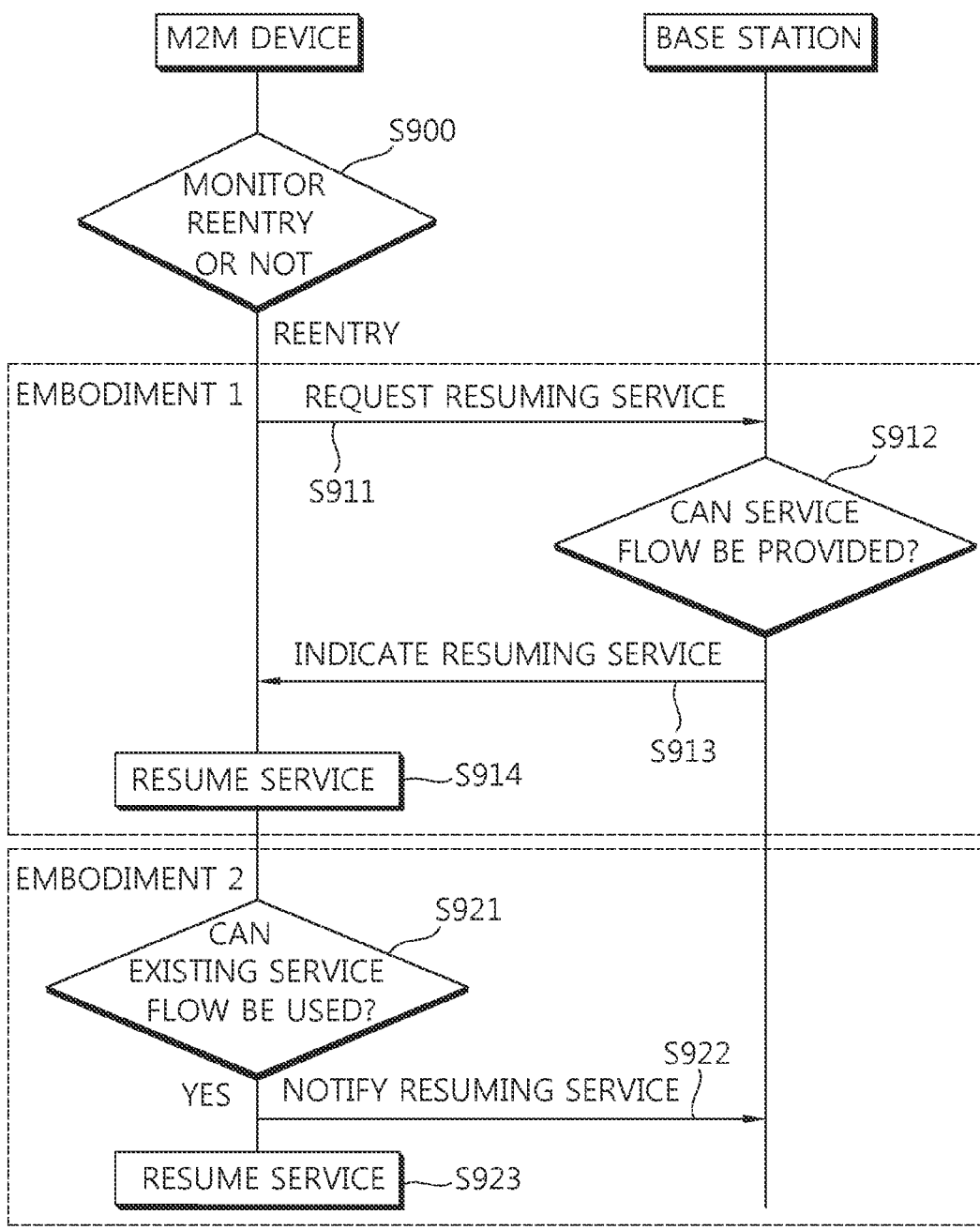
FIG. 9 illustrates a flowchart for resuming the M2M service when the M2M device reenters the M2M group zone according to an embodiment of the present invention.

FIG. 9 is a flowchart illustrating a method for resuming the M2M service when the M2M device reenters the M2M group zone according to an embodiment of the present invention.

As described in the example of FIG. 8, in the case in which the M2M device escapes from the domain where the existing MGID is available, that is, the M2M group zone, the M2M device monitors whether to reenter the M2M group zone (S900). For example, when the ID (alternatively, the M2M zone identifier) of the network entity is changed, the M2M device may verify whether to return to the domain where the existing MGID is available again.

As an embodiment, when the M2M device returns to the domain where the existing MGID is available again, the M2M device transmits a service resuming request message to the base station (S911). The base station judges whether the M2M device may use the existing service flow by using the existing MGID as it is (S912). That is, the base station judges whether to provide a service flow based on the existing MGID. In the case in which the existing MGID is usable, that is, in the case in which the service flow may be provided, the base station may notify to the M2M device that the service may be resumed without updating the MGID or indicate that the service may be resumed by transmitting a service resuming message (S913). Finally, the M2M device resumes the service by using the existing MGID (S914).

As another embodiment, when the M2M device returns to the domain where the existing MGID is available again, the M2M device judges whether to use the existing service flow by using the existing MGID as it is (S921). When the existing MGID is usable, the M2M device transmits a service resuming notification message to the base station (S922). Further, the M2M device resumes the service by using the existing MGID (S923). Meanwhile, the M2M device may resume the service simultaneously with transmitting the service resuming notification message or first resume the service and thereafter, notify the resumed service to the base station. Further, the M2M device may judge whether to use the existing service flow and/or resume the service immediately without transmitting the service resuming notification message. That is, the aforementioned steps (for example, steps S922 and S923) may be performed in different orders or simultaneously and some steps (for example, steps S921 and/or S922) may be skipped.

Figure 10:
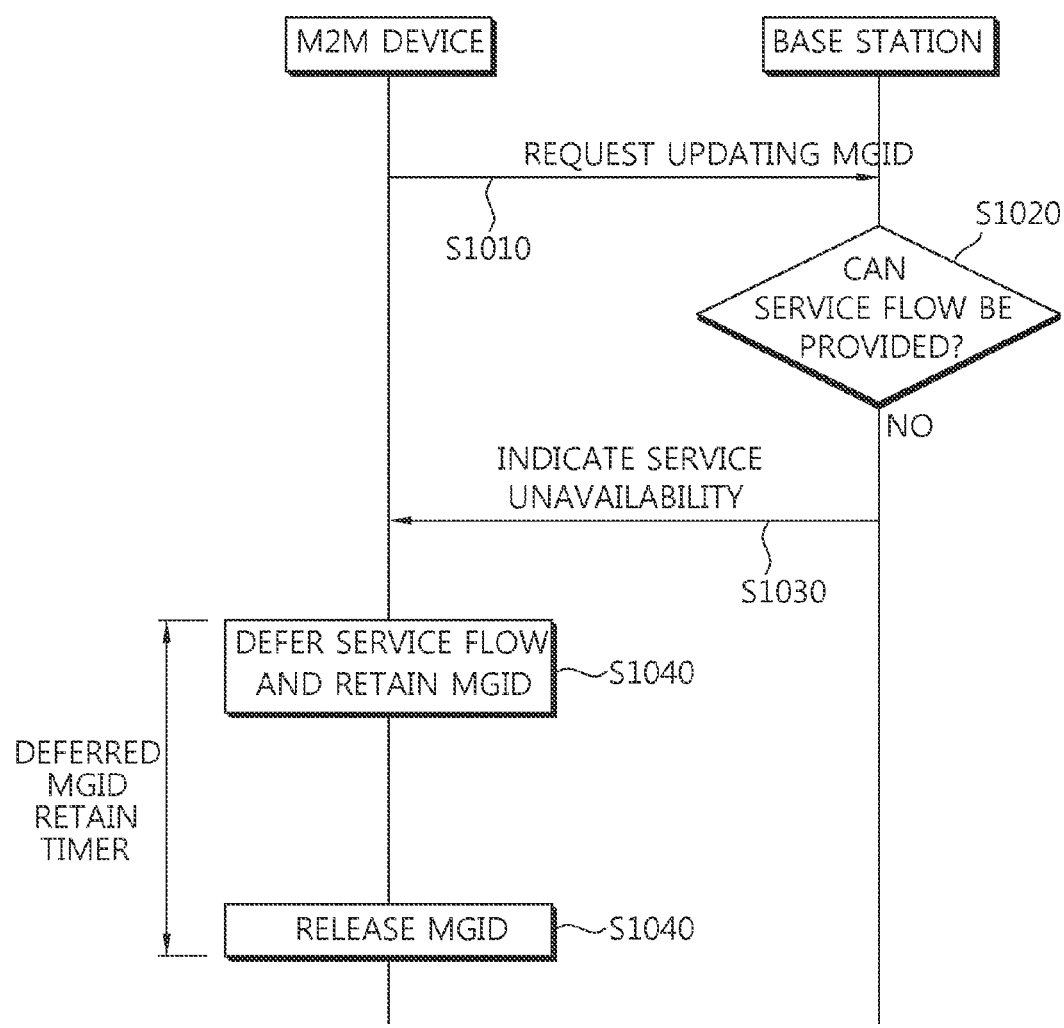
FIG. 10 illustrates a flowchart for resuming an M2M service when an M2M device escapes from an M2M group zone according to another embodiment of the present invention.

FIG. 10 is a flowchart illustrating a method for resuming an M2M service when an M2M device escapes from an M2M group zone according to another embodiment of the present invention.

Referring to FIG. 10, a step (step S1010) in which the M2M device transmits an MGID update request message to the base station, a step (S1020) in which the base station judges whether to provide the service flow used by the M2M device within the current coverage (S1020), and a step (S1030) in which the base station transmits the service unavailability indication message to the M2M device are the same or similar as the respective steps (S810 to S830) of FIG. 8.

Meanwhile, in the embodiment of FIG. 10, when receiving the service unavailability indication message, the M2M device may activate a differed MGID retain timer together with deferring and retaining the corresponding service flow (S1040). The deferred MGID retain timer indicates a time (alternatively, frame) of retaining the MGID when the service flow is deferred. Hereinafter, an operation of the deferred MGID retain timer will be described in more detail.

When the M2M device returns to the domain where the existing MGID is available, that is, the M2M group zone before the deferred MGID retain timer is terminated, the M2M device ends the deferred MGID retain timer and resumes the service according to the embodiment (for example, steps S911 to S914 and steps S921 to S923).

When the deferred MGID retain timer is terminated before the M2M device returns to the domain where the existing MGID is available, that is, the M2M group zone, the M2M device releases the MGID (S1050). The releasing process of the MGID may be performed in an IEEE 802.16 based DSD procedure.

Figure 11:
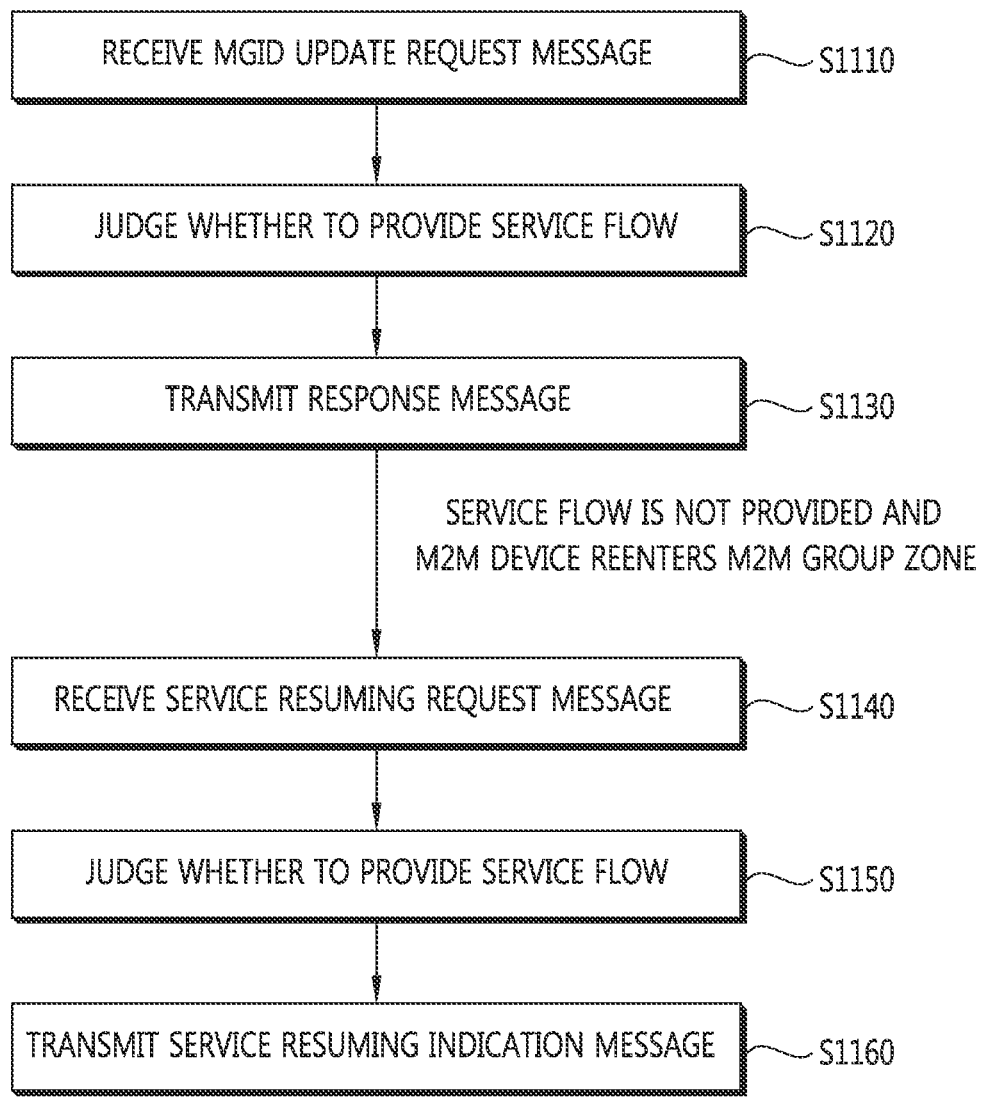
FIG. 11 illustrates a flowchart for providing the M2M service by a base station in M2M communication according to an embodiment of the present invention.

FIG. 11 is a flowchart illustrating a method for providing the M2M service by a base station in M2M communication according to an embodiment of the present invention.

The base station receives an update request message of requesting updating the M2M group identifier (MGID) from the M2M device (S1110). The update request message may include the M2M group identifier and the M2M zone identifier. As described above, the M2M group identifier identifies the service flow shared by the group of the M2M devices in the M2M group zone and the M2M zone identifier identifies the M2M group zone.

The base station judges whether the service flow identified by the M2M group identifier is provided in the zone indicated by the M2M zone identifier based on the update request message (S1120).

The base station transmits a response message to the update request message to the M2M device (S1130).

When the service flow is provided, the base station may transmit an update response message including a new M2M group identifier. When the service flow is not provided, the base station may indicate to the M2M device retaining of the M2M group identifier and deferring of the service flow.

Whether the service flow is provided may be transferred by using a service unavailability indicator. That is, the base station may transmit a response message including the service unavailability indicator.

Meanwhile, the response message may be transmitted in an IEEE 802.16 based DSC procedure or may mean a ranging-response (RNG-RSP) message. For example, when the M2M device is in the connected mode, the base station may transmit the response message in the IEEE 802.16 based DSC procedure. For example, when the M2M device is in the idle mode, the response message station may be an IEEE 802.16 based RNG-RSP message.

The service flow is not provided in the steps (S1110 to S1130), but when the M2M device moves to reenter the domain where the M2M group identifier is available, that is, the domain indicated by the M2M zone identifier, the base station may receive the service resuming request message from the M2M device (S1140).

The base station may judge whether the service flow identified by the M2M group identifier is provided in the zone indicated by the M2M zone identifier again based on the service resuming request message and the update request message (S1150).

When the service flow is provided, the base station may transmit the service resuming indication message to the M2M device (S1160).

Figure 12:
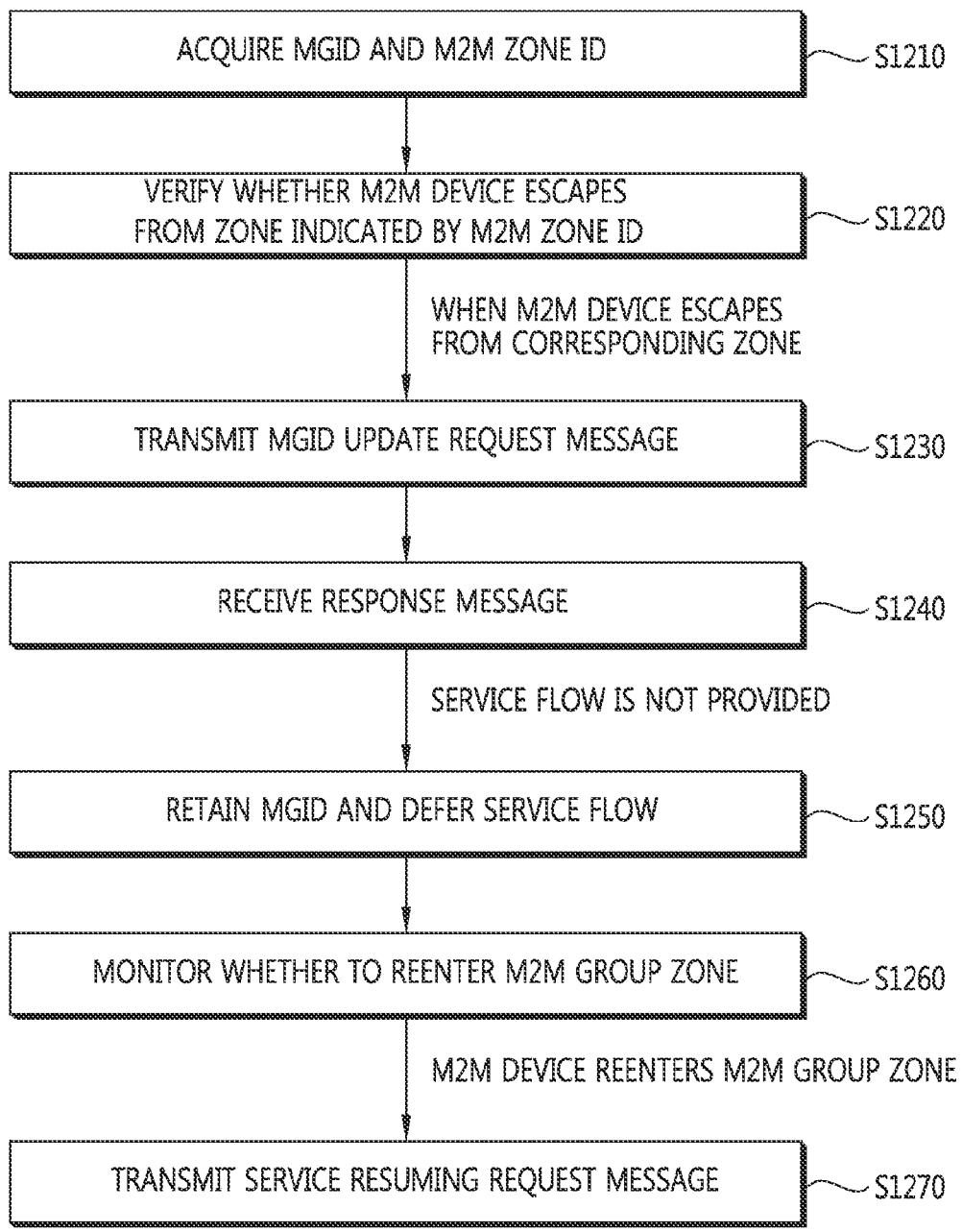
FIG. 12 illustrates a flowchart for M2M communication by the M2M device according to an embodiment of the present invention.

FIG. 12 is a flowchart illustrating a method for M2M communication by the M2M device according to an embodiment of the present invention.

The M2M device acquires the M2M group identifier (MGID) and the M2M zone identifier (S1210). As described above, the M2M group identifier identifies the service flow shared by the group of the M2M devices in the M2M group zone and the M2M zone identifier identifies the M2M group zone.

The M2M device verifies whether the M2M device itself escapes from the zone indicated by the M2M zone identifier.

When the M2M device escapes from the zone indicated by the M2M zone identifier, the M2M device transmits to the base station the update request message of requesting updating the M2M group identifier (S1230).

The M2M device receives the response message to the update request message from the base station (S1240). As described above, the response message may include the service unavailability indicator that indicates whether the service flow identified by the M2M group identifier is provided in the zone indicated by the M2M zone identifier.

Further, as described above, the response message may be transmitted in the IEEE 802.16 based DSC procedure or may mean the ranging-response (RNG-RSP) message. For example, when the M2M device is in the connected mode, the base station may transmit the response message in the IEEE 802.16 based DSC procedure. For example, when the M2M device is in the idle mode, the response message may be the IEEE 802.16 based RNG-RSP message.

Meanwhile, when the service unavailability indicator indicates that the service flow is not provided, the M2M device retains the M2M group identifier and defers the service flow (S1250). In this case, as described above, the M2M device may active the deferred MGID retain timer.

Thereafter, the M2M device monitors whether the M2M device itself reenters the domain where the M2M group identifier is available, that is, the zone indicated by the existing M2M zone identifier (S1260).

When reentering the zone indicated by the existing M2M zone identifier, the M2M device transmits to the base station the service resuming request message of requesting resuming the service flow (S1070). When receiving the service resuming indication message as the response to the servicer resuming request message, the M2M device may resume the existing service flow. Further, as described above, a method may be used, in which the M2M device does not transmit the service resuming request message but resume the service flow immediately under the judgment of the M2M device.

On the contrary, when the M2M device does not reenter the zone indicated by the existing M2M zone identifier before the deferred MGID retain timer is terminated, the M2M device releases the MGID and ends the corresponding service flow.

Figure 13:
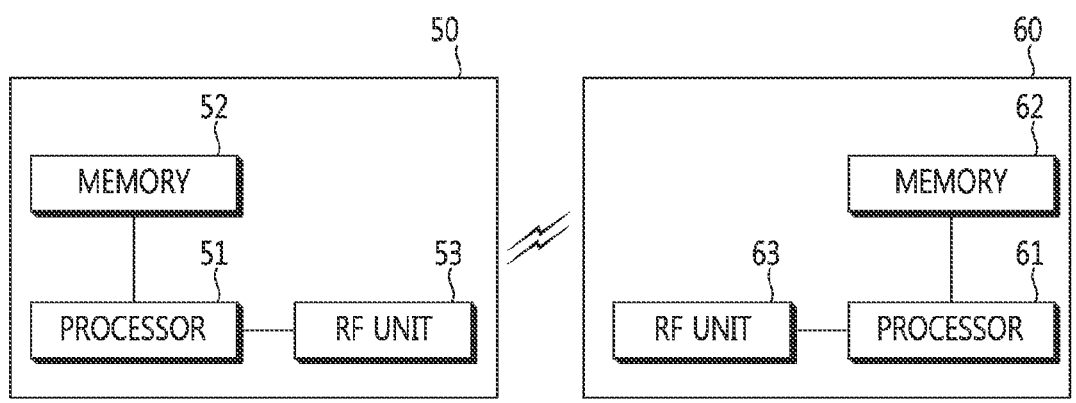
FIG. 13 is a block diagram illustrating a wireless communication system in which an embodiment of the present invention is implemented.

FIG. 13 is a block diagram illustrating a wireless communication system in which an embodiment of the present invention is implemented.

An M2M device 50 includes a processor 51, a memory 52, and a radio frequency (RF) unit 53. The memory 52 is connected with the processor 51 to store various pieces of information for driving the processor 51. The RF unit 53 is connected with the processor 51 to transmit and/or receive a radio signal. The processor 51 implements a function, a process, and/or a method which are proposed. In the embodiment, the operation of the MTC device may be implemented by the processor 51.

A base station 60 includes a processor 61, a memory 62, and an RF unit 63. The memory 62 is connected with the processor 61 to store various pieces of information for driving the processor 61. The RF unit 63 is connected with the processor 61 to transmit and/or receive the radio signal. The processor 61 implements a function, a process, and/or a method which are proposed. In the embodiment, the operation of the base station may be implemented by the processor 61.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or another storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be present inside or outside the processor and may be connected with the processor through various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for a base station providing a machine to machine (M2M) service in M2M communication, the method comprising:
   receiving an update request message from an M2M device, the request message requesting update of an M2M group identifier (MGID) and including the MGID and an M2M zone identifier, the MGID identifying a service flow shared by a group of M2M devices in an M2M group zone and the M2M zone identifier identifying the M2M group zone; and
   transmitting a response message to the M2M device in response to the received request message, the response message including a service unavailability indicator that indicates whether the identified service flow is provided in the identified M2M group zone.

2. The method of claim 1, wherein:
   the response message is transmitted according to Institute of Electrical and Electronics Engineers (IEEE) 802.16 based a dynamic service change (DSC) procedure when the M2M device is in a connected mode.

3. The method of claim 1, wherein:
   the response message is transmitted according to Institute of Electrical and Electronics Engineers (IEEE) 802.16 based a RNG-RSP (Ranging-Response) message when the M2M device is in an idle mode.

4. A method for an M2M device providing a machine to machine (M2M) communication, the method comprising:
   acquiring an M2M group identifier (MGID) and an M2M zone identifier, the MGID identifying a service flow shared by a group of M2M devices in an M2M group zone and the M2M zone identifier identifying the M2M group zone;
   verifying whether the M2M device leaves the M2M group zone;
   transmitting an update request message that requests update of the MGID when the M2M device leaves the M2M group zone; and
   receiving a response message from a base station (BS) in response to the update request message, the response message including a service unavailability indicator that indicates whether the identified service flow is provided in the identified M2M group zone.

5. The method of claim 4, wherein:
   the response message is received according to Institute of Electrical and Electronics Engineers (IEEE) 802.16 based dynamic service change (DSC) procedure when the M2M device is in a connected mode.

6. The method of claim 4, wherein:
   the response message is transmitted according to Institute of Electrical and Electronics Engineers (IEEE) 802.16 based a RNG-RSP (Ranging-Response) message when the M2M device is in an idle mode.

7. The method of claim 4, further comprising:
   retaining the MGID and deferring the identified service flow when the service unavailability indicator indicates that the identified service flow is not provided.

8. The method of claim 7, further comprising:
   monitoring whether the M2M device reenters the M2M group zone; and
   transmitting a resuming request message to the BS requesting that the identified service flow be resumed when the M2M device reenters the M2M group zone.

9. The method of claim 7, further comprising:
   monitoring whether the M2M device reenters the M2M group zone; and
   transmitting a resuming notification message to the BS notifying that the identified service flow is resumed when the M2M device reenters the M2M group zone.

10. The method of claim 7, further comprising:
    monitoring whether the M2M device reenters the M2M group zone; and
    activating an MGID retain timer indicating a time that the MGID is retained when the M2M device reenters the M2M group zone.

11. The method of claim 10, further comprising:
    releasing the MGID after the time indicated by the MGID retain timer elapses.

12. A machine to machine (M2M) device in an M2M communication system, the device comprising:
    a radio frequency (RF) unit configured for transmitting or receiving a radio signal; and
    a processor operatively coupled to the RF unit, the processor configured for:
    acquiring an M2M group identifier (MGID) and an M2M zone identifier, the MGID identifying a service flow shared by a group of M2M devices in an M2M group zone and the identified M2M zone identifier identifying the M2M group zone;
    verifying whether the M2M device leaves the identified M2M group zone;
    transmitting an update request message that requests update of the MGID when the M2M device leaves the identified M2M group zone; and
    receiving a response message from a base station (BS) in response to the update request message, the response message including a service unavailability indicator that indicates whether the identified service flow is provided in the identified M2M group zone.

13. The M2M device of claim 12, wherein the processor is further configured for;
    retaining the MGID and deferring the identified service flow when the service unavailability indicator indicates that the identified service flow is not provided.

14. The M2M device of claim 12, wherein the processor is further configured for;
    monitoring whether the M2M device reenters the M2M group zone; and
    transmitting a resuming request message to the BS requesting that the identified service flow be resumed when the M2M device reenters the M2M group zone.

15. The M2M device of claim 12, wherein the processor is configured for;
    monitoring whether the M2M device reenters the M2M group zone; and
    resuming the identified service flow when the M2M device reenters the M2M group zone.

16. The M2M device of claim 13, wherein the processor is further configured for;
  monitoring whether the M2M device reenters the M2M group zone; and
  activating an MGID retain timer indicating a time that the MGID is retained when the M2M device reenters the M2M group zone.

17. The M2M device of claim 16, wherein the processor is further configured for;
  releasing the MGID after the time indicated by the M2M group identifier retain timer elapses.

\* \* \* \* \*